(12) United States Patent
Didner et al.

(10) Patent No.: US 10,179,076 B2
(45) Date of Patent: Jan. 15, 2019

(54) GEAR-SHIFT ARRANGEMENT FOR A WHEELCHAIR WHEEL

(71) Applicant: GEARWHEEL AB, Västerås (SE)

(72) Inventors: Nils Didner, Stockholm (SE); Dan Åkerfeldt, Knivsta (SE)

(73) Assignee: GEARWHEEL AB, Västerås (SE)

( * ) Notice: Subject to any disclaimer, the term of this patent is extended or adjusted under 35 U.S.C. 154(b) by 121 days.

(21) Appl. No.: 15/306,893

(22) PCT Filed: Apr. 9, 2015

(86) PCT No.: PCT/SE2015/050421
§ 371 (c)(1),
(2) Date: Oct. 26, 2016

(87) PCT Pub. No.: WO2015/167387
PCT Pub. Date: Nov. 5, 2015

(65) Prior Publication Data
US 2017/0049644 A1    Feb. 23, 2017

(30) Foreign Application Priority Data
Apr. 30, 2014  (SE) ...................................... 1450512

(51) Int. Cl.
*A61G 5/02*   (2006.01)
*A61G 5/10*   (2006.01)
*B62M 11/16*  (2006.01)
(52) U.S. Cl.
CPC ............. *A61G 5/028* (2013.01); *A61G 5/023* (2013.01); *A61G 5/024* (2013.01); *A61G 5/1054* (2016.11); *B62M 11/16* (2013.01)

(58) Field of Classification Search
CPC ........ A61G 5/028; A61G 5/023; A61G 5/024; B62M 11/16; B62M 11/04
See application file for complete search history.

(56) References Cited

U.S. PATENT DOCUMENTS 3,937,309 A * 2/1976 Schulz ................... B62M 11/16
192/217.4
4,069,725 A * 1/1978 Segawa .................. B62M 11/16
192/217.4

(Continued)

FOREIGN PATENT DOCUMENTS

GB         2 490 579 A    11/2012
WO    WO 2008/146136 A2   12/2008
WO    WO-2012/105879 A1    8/2012

*Primary Examiner* — Jacob D Knutson
*Assistant Examiner* — Michael R Stabley
(74) *Attorney, Agent, or Firm* — Foley & Lardner LLP

(57) ABSTRACT

A wheel assembly comprising a wheel (5) for a wheelchair (1), a gripping ring (6) connected to the wheel, and a gear-shift arrangement (7; 10; 40; 70); the wheel being provided with a wheel axle (17; 47; 77); the gear-shift arrangement being configured to change a gear ratio between the wheel and the gripping ring; the gear-shift arrangement comprising an internal-gear hub (8; 16; 46; 76) comprising a number of internal gears (18, 18', 18"; 48, 48', 48"; 78, 78', 78"), a shift member (15; 45; 75), and a gear selector (9; 11; 41; 71) located on the same side of the wheel as the gripping ring, wherein the gear selector is operatively connected to the shift member (15; 45; 75) that is axially moveable within the internal-gear hub to engage a specific gear of said number of internal gears, and that the gear selector has an inner base portion (12; 42; 72) and an outer handle portion (13; 43; 73) and extends radially away from the wheel axle.

16 Claims, 3 Drawing Sheets

(56) References Cited

U.S. PATENT DOCUMENTS

| | | | |
|---|---|---|---|
| 4,727,965 A * | 3/1988 | Zach | A61G 5/02 192/217.4 |
| 5,362,081 A | 11/1994 | Beidler et al. | |
| 5,482,305 A | 1/1996 | Jeffries et al. | |
| 5,486,016 A * | 1/1996 | Godin | A61G 5/02 280/236 |
| 6,017,046 A | 1/2000 | Markovic | |
| 6,117,040 A * | 9/2000 | Watterodt | F16H 3/54 475/138 |
| 6,428,028 B1 * | 8/2002 | Folino | A61G 5/02 280/249 |
| 6,652,405 B2 * | 11/2003 | Staheli | B60K 17/046 180/372 |
| 6,805,371 B2 | 10/2004 | Meginniss, III et al. | |
| 7,520,519 B2 * | 4/2009 | Smurthwaite, Jr. | A61G 5/023 280/242.1 |
| 7,832,753 B2 | 11/2010 | Sörquist | |
| 7,837,210 B2 * | 11/2010 | Kylstra | A61G 5/025 280/244 |
| 8,388,490 B2 | 3/2013 | Su et al. | |
| 2010/0320719 A1 | 12/2010 | Rand et al. | |

\* cited by examiner

GEAR-SHIFT ARRANGEMENT FOR A WHEELCHAIR WHEEL

FIELD OF THE INVENTION

The present invention relates to a gear-shift arrangement used in a wheelchair wheel having a wheel axle, and particularly to a gear shift arrangement comprising an internal-gear hub and a gear selector, and even more particularly to a gear-shift arrangement comprising an internal-gear hub and a gear selector, which, outside of the internal-gear hub, extends essentially transversally to the wheel axle and essentially in parallel to the wheelchair wheel.

BACKGROUND OF THE INVENTION

It is becoming increasingly more common for wheelchair wheels to be provided with gears in order to facilitate the use of wheelchairs by different users, especially when travelling on surfaces having varying gradients. This is especially the case for wheels intended to be used on manually powered wheelchairs.

These manually powered wheelchairs are propelled, steered and braked by a user by either turning or gripping a ring attached to each of the two main wheels of the wheelchair. By providing a gear mechanism between the gripping ring and the wheelchair wheel, the rotational speed of the gripping ring can differ from the rotational speed of the wheelchair wheel, which, for example, enables the user to reduce or increase the number of gripping ring actions for travelling a given distance. Typically, a user may want to reduce the number of gripping ring actions when travelling on smooth surfaces and in easy and flat terrain, whereas a user may want to increase the number of gripping ring actions when travelling in hard terrain and/or uphill.

The advantages of providing a wheelchair wheel with a gear mechanism have been recognized in several patent applications. For example, U.S. Pat. No. 6,805,371 to Meginniss, III et al. discloses a two-gear arrangement for a wheelchair wheel, comprising a shift bar, which, when a user wants to shift gear, is moved perpendicularly to the wheelchair axle and through a housing, which contains a gear assembly and which is mounted on the outside of the wheelchair wheel. A disadvantage with this arrangement is that it—since it can be characterized as an outside or external gear-shift arrangement—adds to the overall width of the wheelchair. An external gear-shift arrangement can also be said to inherently have a larger moment of inertia than an internal gear-shift arrangement.

In U.S. Pat. No. 5,482,305 to Jeffries et al. a gear assembly within a hub is disclosed, which comprises a disc-shaped shifter, the turning of which causes a shift pin to move in a helical slot provided in a tubular sleeve arranged at the end of the main wheel axle and to move axially in an elongated linear slot in the main wheel axle, to accomplish coupling to direct drive mode and to lower-gear mode via a planetary gear system, respectively. To achieve enough axial shifting movement within the limited space provided within the interior of the wheel assembly hub, the pitch of the helical sleeve is high (large), meaning that considerable force has to be exercised by a user on the relatively small disc-shaped shifter in order to shift gear.

Although the gear-shift mechanisms disclosed in the patents listed above fulfill the intended purpose of providing a gear-shift arrangement for a wheelchair wheel, they are still associated with disadvantages, not least from a user's perspective when it comes to user-friendliness and maneuverability. A general object of the present invention is therefore to provide an improved gear-shift arrangement for a wheelchair wheel, which is easy to operate and which not unnecessarily adds to the overall width of the wheelchair wheel and thereby to the width of the wheelchair. Another object of the present invention is to provide an improved gear-shift arrangement which, with maintained operability and user-friendliness, easily can be adapted to a multi-gear arrangement comprising more than two gears. A further object of the invention is to provide a gear-shift arrangement, which in a reliable way can be operated by a minimum amount of force.

SUMMARY OF THE INVENTION

The above-mentioned objects are achieved by the present invention according to the independent claim. Preferred embodiments are set forth in the dependent claims.

The present disclosure relates to a wheel assembly comprising a wheel for a wheelchair, a gripping ring (an outer gripping ring) connected to the wheel, and a gear-shift arrangement, the wheel being provided with a wheel axle, the gear-shift arrangement being configured to change a gear ratio between the wheel and the gripping ring, the gear-shift arrangement comprising an internal-gear hub comprising a number of internal gears, a shift member, and a gear selector, wherein the gear selector and the gripping ring are located on the same side of the wheel (i.e. on the outside of the wheel, as opposed to the inside of the wheel where the seat of the wheelchair is located once the wheelchair has been assembled). The gear selector is operatively connected to the shift member, which is axially moveable within the internal-gear hub to engage a specific gear of said number of internal gears, and that the gear selector has an inner base portion and an outer handle portion and extends radially away from the wheel axle.

According to the present invention, a gear-shift arrangement for a wheelchair wheel having a wheel axle is provided, which comprises an internal-gear hub, which, in turn, comprises an axially movable shift member and a number of axially spaced gears and which is operatively connected to a gear selector via a connector member, wherein the gear selector, outside of the internal-gear hub, extends essentially radially from the wheel axle and essentially in parallel to the wheelchair wheel.

The internal-gear hub is preferably provided with a planetary gear. With the arrangement referred to according to the present invention, such a planetary gear is provided with two, three, four or more gear positions. As will be demonstrated below, a special advantage of the invention is that even a large number of gear positions are easily incorporated into the present gear-shift arrangement. As the function of a planetary gear is well-known in the art, it is not described in more detail herein, except that it should be mentioned that the planetary gear comprises a shift member, which is the axially moveable member which, via the gear selector and the connector member, is moved along the wheel axle to engage different gears of the planetary gear, to thereby accomplish different gear ratios.

In embodiments of the present invention, a gear selector has the general shape of a handle, whose enlarged inner base part comprises a cam curve arrangement being provided with a number of fixed positions, in which a sliding element, which, via a connector member, is operatively connected to a shift member, can be positioned. The cam curve extends a limited distance circumferentially around the wheel axle, with the fixed positions—that correspond to different gears—being located at different radii away from the wheel axle. Since the radial difference between two adjacent cam-curve positions is small in comparison with the circumferential difference, the force needed to accomplish shifting of gear is small (in accordance with the well-known relation for the work carried out by applying a force along a path). Since the gear selector handle, which in some embodiments is operatively connected to a shift member via a connector member in the shape of a chain or a wire, extends radially away from the wheel axle and is moved around the wheel axle, this gear selector system is very compact and does not add significantly to the overall width of the wheelchair wheel.

In another embodiment of the invention, the gear selector has the shape of a lever and the connector member is a stiff element, which can be regarded as an extension of the shift member. To shift gears, the lever is moved outwards from the wheelchair wheel or inwards towards the wheel.

BRIEF DESCRIPTION OF THE DRAWINGS

FIGS. 2a and 2b illustrate schematically a first embodiment of a gear-shift arrangement according to the invention in a first position, wherein FIG. 2a shows a side-view of a gear selector with a cam curve and a connector member in the shape of a chain, and wherein FIG. 2b shows a cross-section of an accompanying internal-gear hub provided with a gear system comprising gears and a shift member connected to the connector member.

FIGS. 3a and 3b illustrate schematically a second embodiment of a gear-shift arrangement according to the invention, wherein FIG. 3a shows a side-view of a gear selector with a cam curve and a connector member in the shape of a wire running in a sleeve, and wherein FIG. 3b shows a cross-section of an accompanying internal-gear hub provided with a gear system comprising gears and a shift member connected to the connector member.

FIGS. 4a and 4b illustrate schematically a third embodiment of a gear-shift arrangement according to the invention in a first position, wherein FIG. 4a shows a side-view of a gear selector in the shape of a lever, and wherein FIG. 4b shows a cross-section of an accompanying internal-gear hub provided with a gear system comprising gears and an extended shift member connected to the lever.

DETAILED DESCRIPTION OF PREFERRED EMBODIMENTS

Figure 1:
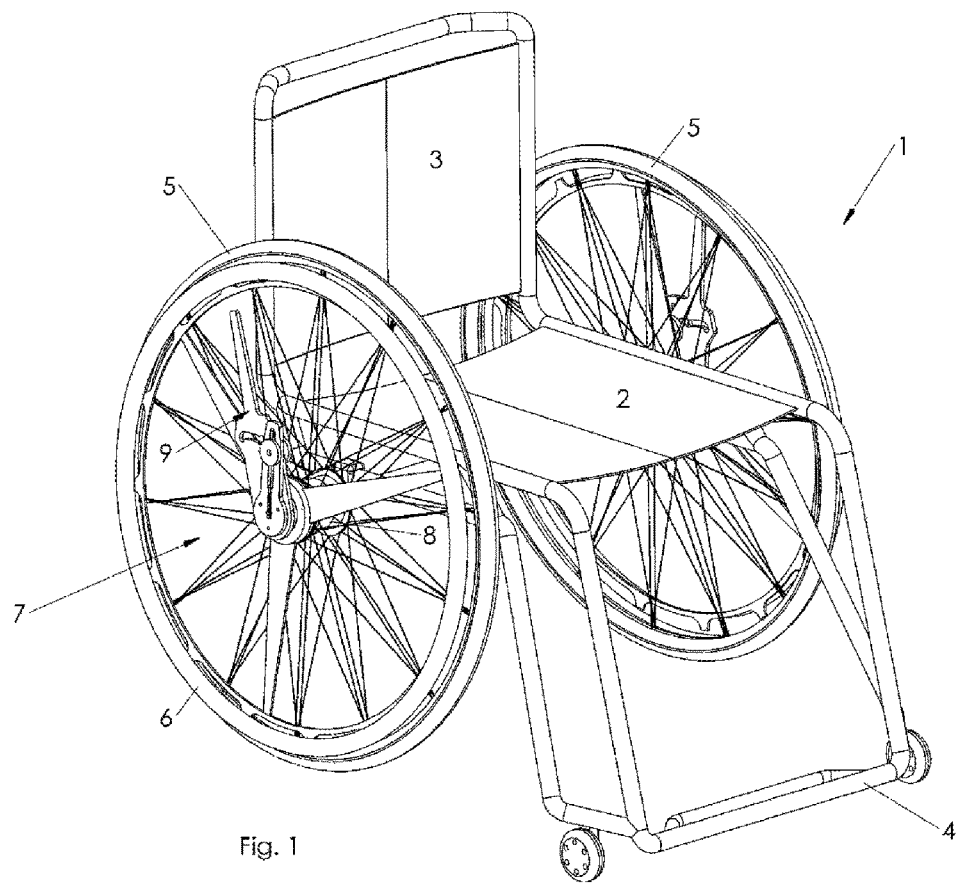
FIG. 1 illustrates schematically a wheelchair with a wheel provided with a gear-shift arrangement according to the present invention.

The present invention relates to a wheelchair and more specifically to the main driving wheels of a wheelchair. An exemplifying wheelchair is depicted in FIG. 1, wherein a wheelchair 1 essentially comprises a seat 2, a back 3, a foot support 4, and two wheels 5. Each of the two wheels 5 is provided with an outer gripping ring 6 and an internal gear-shift arrangement 7. In FIG. 1 only one of the two gear-shift arrangements 7 is visible. When a user wants to propel the wheelchair 1 in a forward direction, he or she grips the gripping rings 6 and pushes forward, which, since each gripping ring 6 is operatively connected to a respective wheel 5, moves the wheelchair 1 forward. If the wheel 5 and the gripping ring 6 were fixedly connected to each other, the wheel 5 would rotate with the same rotational speed as the gripping ring 6. This means that when a user travels uphill or in rough terrain, the user must exercise a considerable force to be able to move the wheelchair 1 at all, whereas the user when traveling downhill or in flat and easy terrain cannot move his/her hands fast enough to travel as fast as his/her arm strength actually would allow him/her to do. By providing a gear-shift arrangement between the wheel 5 and the gripping ring 6, the rotational speed of the wheel 5 can differ from the rotational speed of the gripping ring 6, thereby allowing a more efficient use of the user's strength when propelling the wheelchair 1. From FIG. 1 it may be discernible that the wheels 5 are slightly tilted inwards, towards the seat 2 and the back 3. In other words, the distance between the wheels 5 as measured at ground level is longer than the corresponding distance measured at top level. This inclination angle to an imaginary vertical line can, for example, be between one (1) degree and fifteen (15) degrees. To arrange for such an inclination of the wheelchair wheels 5 is particularly advantageous in combination with the different embodiments of the present invention, as will be demonstrated below.

Still with reference to FIG. 1, the gear-shift arrangement 7 comprises further an internal-gear hub 8 with a wheel axle (not visible in the figure) and a gear selector 9. The internal-gear hub 8 is preferably a planetary gear system, which is well-known in the art and will not be described in detail herein. Suitable planetary gear systems are, for example, described in the U.S. Pat. No. 8,388,490 to Su et al. which relates to a fixed internal-gear hub. Suitable internal-gear hubs are, for example, commercially available from the company Sturmey-Archer, e.g. the model S3X. Below different embodiments of gear-shift arrangements will be disclosed and described, where a common feature is that a gear selector extends essentially perpendicularly or radially to a wheel axle of a wheelchair wheel, which, in combination with an internal-gear hub, achieves the goal of minimizing the extra width that a gear-shift arrangement adds to the wheel and thereby to the wheelchair. Gear-shift arrangements according to the present invention are user-friendly and easy to operate, and require, for example, only a very small amount of force for shifting gears. As will be seen, gear-shift arrangements disclosed herein are further adapted to incorporate two, three or more gear positions.

Figure 2A:
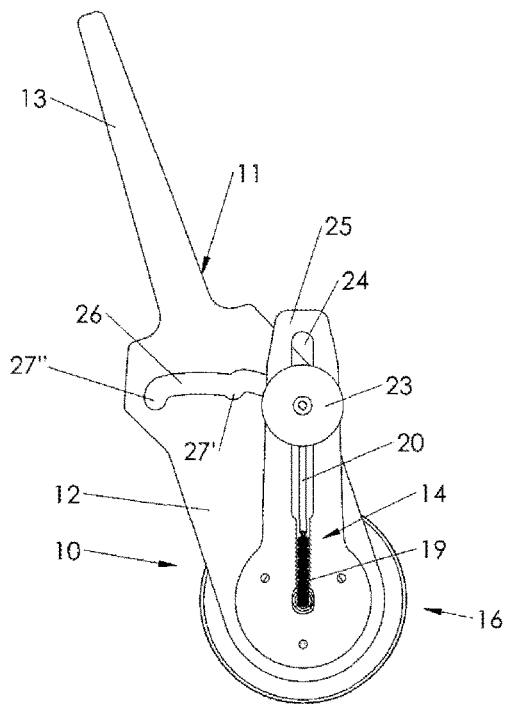
Figure 2B:
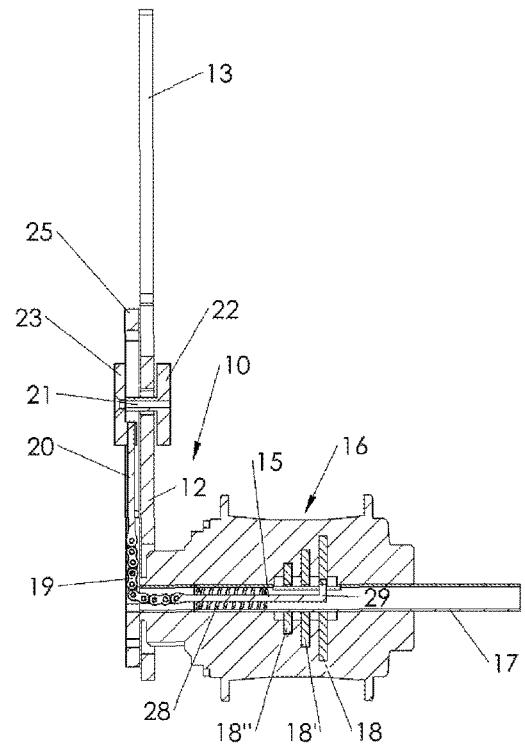
Figure 2C:
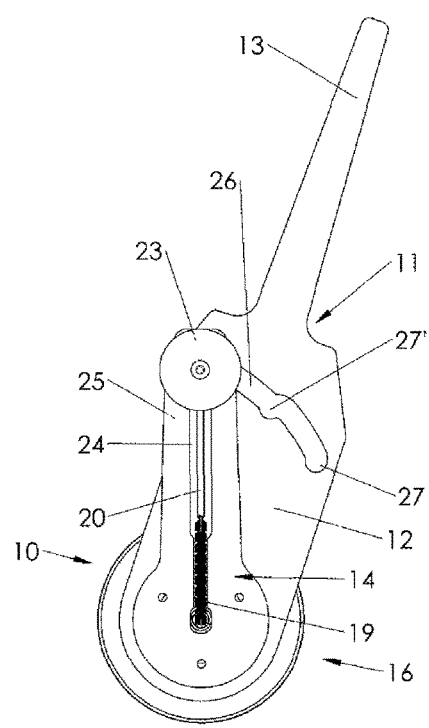
FIGS. 2c and 2d show the gear-shift arrangement according to FIGS. 2a and 2b in a second position.
Figure 2D:
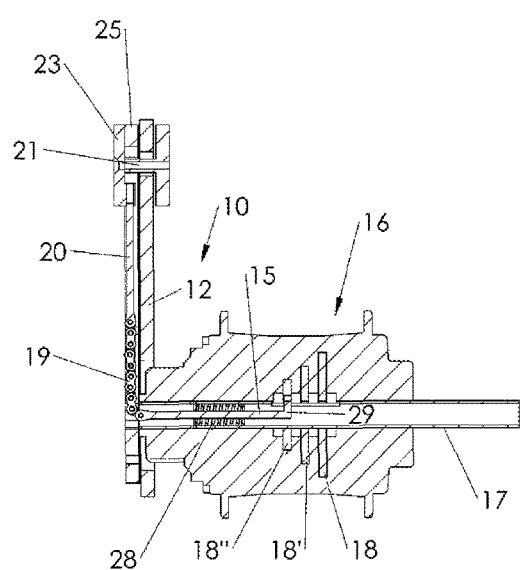

FIGS. 2a and 2b as well as FIGS. 2c and 2d show a first embodiment of a gear-shift arrangement 10, which comprises a gear selector 11, which has a lower or inner base portion 12 and an upper or outer portion in the shape of a handle 13, a connector member 14, and a shift member 15. The shift member 15 is provided with a cogged portion 29 and is inside an internal-gear hub 16 having a wheel axle 17 axially moveable to engage gears 18, 18' and 18", respectively. In this embodiment, the connector member 14 is in the form of a chain 19, which is attached to the shift member 15, and a pin 20, which is attached to a sliding element 21 in the shape of a spigot shaft 21 being provided with a distal securing washer 22 and whose proximal portion is provided with a holding washer 23. While being secured by the washer 22 and the washer 23, the spigot shaft 21 can slide in a vertical direction in a guide slot 24 provided in a guide member 25, and can further slide essentially circumferentially in a cam curve 26 provided in the base portion 12 of the gear selector 11. As can be seen from FIGS. 2a and 2c, the cam curve 26 comprises three positions 27, 27' and 27", each of which corresponds to a respective gear 18, 18' or 18". The internal-gear hub 16 is further provided with a return spring 28, which facilitates gear shifting in one direction, i.e. to move shift member 15 to the right in FIG. 2b and FIG. 2d.

By comparing FIGS. 2a-b with FIGS. 2c-d, it can be seen that a user by gripping the handle or handle portion 13 and moving gear selector 11 in a circumferential direction, such that the spigot shaft 21 moves from position 27 to position 27" in the cam curve 26, applies a pulling force on connector member 14, which, in turn, moves shift member 15 and its cogged portion 29 from engagement with gear 18 into engagement with gear 18". It can be noted that this movement compresses return spring 28 and is thus accomplished against the force of return spring 28. It should further be appreciated that while spigot shaft 21 moves a comparatively long distance in the circumferential direction along and within cam curve 26, spigot shaft 21 moves only a relatively short radial distance of cam curve 26 as well as of guide slot 24 in guide member 25 from the center, i.e. from the wheel axle 17. This has the advantageous effect that the force needed to shift gear is small in accordance with the well-known relation for the work carried out by applying a force along a path. It should also be noted that guide member 25 and thereby guide slot 24 are always directed in a vertical direction. This has the advantageous effect that there is no twisting or turning of chain 19, which positively affects the operability of the gear-shift arrangement 10 as well as contributes to a long useful life of the system.

In order to shift gear back to either gear 18' or all the way back to gear 18, the user grips the handle or handle portion 13 and moves gear selector 11 in the opposite circumferential direction, such that spigot shaft 21 moves to position 27' or to position 27 in the cam curve 26 depending on the user's preference. This movement is now accomplished with the aid of the force that previously compressed return spring 28 in accordance with Hooke's spring law. It should, however, be noted that it is possible to dispense with return spring 28 if a secure and reliable travel path is arranged for chain 19, such that no kinks arise in chain 19. Chain 19 can, for example, run in a sleeve arrangement (not present in FIGS. 2a-d).

Since the gear selector 11 with its handle 13 extends radially from the wheel axle 17 and is only moved back and forth in a circumferential direction around wheel axle 17, the gear shift arrangement 10 does only add a minimal amount of extra width to a wheelchair wheel. This is in particular the case, if the wheelchair wheel is slightly tilted outwards towards the ground, since then the largest width of the wheelchair may still be at ground level.

Figure 3A:
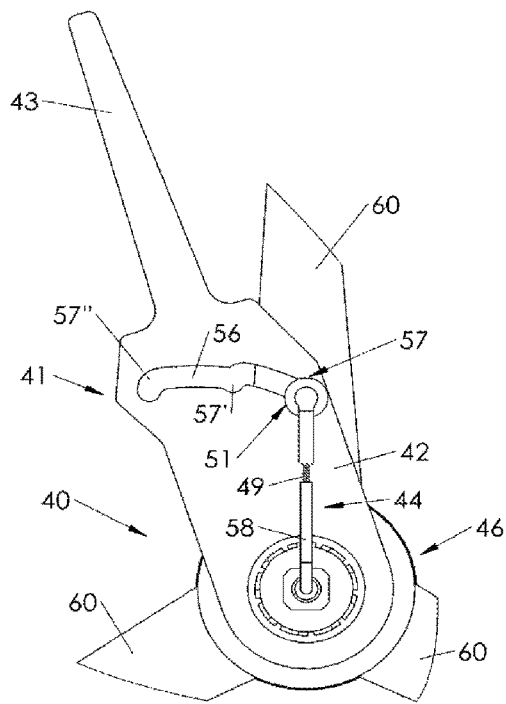
Figure 3B:
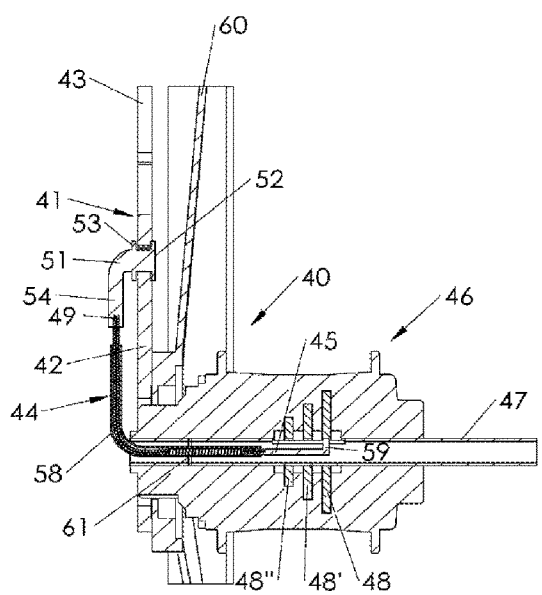

FIGS. 3a and 3b show a second embodiment of a gear-shift arrangement 40, which comprises a gear selector 41, which has a lower or inner base portion 42 and an upper or outer portion in the shape of a handle 43, a connector member 44, and a shift member 45. The shift member 45 is provided with a cogged portion 59 and is inside an internal-gear hub 46 having a wheel axle 47 axially moveable to engage gears 48, 48' and 48", respectively. In this embodiment, the connector member 44 is in the form of a wire 49, which is attached to the shift member 45, and a sliding element 51 in the shape of a bent pin 51. As can be seen in FIG. 3b, a shaft portion 54 of the bent pin 51 extends in the radial direction and is attached to the wire 49 while the other end of the bent pin 51 is bent about 90 degrees and is slideably fitted in a cam curve 56 provided in the base portion 42 of the gear selector 41. The bent pin 51 is provided with two widenings 52 and 53, such that a distal widening 52 is provided on the inside of the cam curve 56 and a proximal widening 53 is provided on the outside of the cam curve 56. As can be seen from FIGS. 3a and 3b, the cam curve 56 comprises three positions 57, 57' and 57", each of which corresponds to a respective gear 48, 48' or 48". In FIGS. 3a and 3b also spokes 60 are visible. Spokes 60 are attached to a gripping ring not seen in FIGS. 3a and 3b.

The gear-shift arrangement 40 works in all essentiality in the same way as gear-shift arrangement 10 described above in conjunction with FIGS. 2a-2d. There are, however, a few notable differences that can be mentioned. The gear-shift arrangement 40 lacks a guide element, corresponding to guide member 25 of the first embodiment described above and which steers a sliding element or member, which in this case would be the bent pin 51 in a vertical direction. Such a guide element could be provided also for gear-shift arrangement 40, but it is believed that a wire, like wire 49, is rather insensitive to any twisting that could arise when the bent pin 51 travels in the cam curve 56. Further, the gear-shift arrangement 40 lacks a return mechanism, corresponding to return spring 28 of gear-shift arrangement 10; instead the wire 49 slides in a sleeve 58. By adapting the diameter of the sleeve 58 to the diameter of the wire 49, kinks in wire 49 are avoided when gear selector 41 is moved such that the wire 49 presses shift member 45 and its cogged portion 59 into engagement with a gear positioned further into the internal-gear hub 46, i.e. to the right in FIG. 3b. Gear-shift arrangement 40 comprises further a spring 61. This spring 61 can be regarded as a load accommodating spring 61, and it operates such that when a user has moved gear selector 41 and thereby shift member 45 in order to shift gears but the cogged portion 59 of shift member 45 cannot get in operative engagement with a selected one of the gears 48, 48' and 48", because the cogs on the selected one of gears 48, 48' and 48" are in the same angular positions as the cogs on the cogged portion 59, the load accommodating spring 61 is compressed (or extended depending on the gear-shift direction) and will execute the intended gear shifting as soon as gears 48, 48' and 48" have rotated a small angular distance such that the cogged portion 59 of the shift member 45 can get into operative engagement with the selected one of the gears 48, 48 and 48". Without the spring 61, the wear on the system will be higher.

According to embodiments of the present invention, a cam curve is provided in a base portion of a gear selector. The base portion can occupy a circle sector ranging from about 10 degrees to about 90 degrees, and more preferably from about 20 degrees to about 50 degrees. The cam curve can be located at an average radial distance from the center, i.e. from the wheel axle, that ranges from 20 mm to 200 mm, and more preferably from 50 mm to 150 mm. The difference in radial distance for consecutive or neighbouring cam curve positions can range from about 1 mm to about 20 mm, preferably from about 3 mm to about 8 mm, while the difference in circumferential distance for consecutive or neighbouring cam curve positions can range from about 5 mm to about 30 mm, whereby it is advantageous that the circumferential distance is longer than the radial distance, as has been discussed above. In a cam curve embodiment of the invention, a handle portion can have a length of about 80 mm to about 120 mm. With these design parameters, it is possible to construct a gear selector containing a cam curve that can accommodate enough cam curve positions for all foreseeable needs.

Figure 4A:
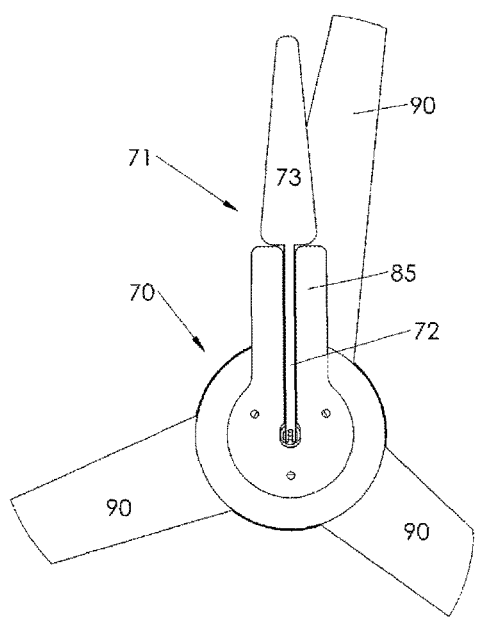
Figure 4B:
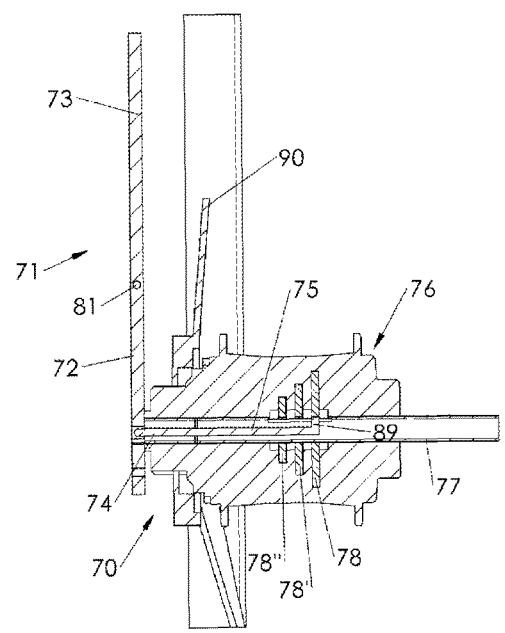
Figure 4C:
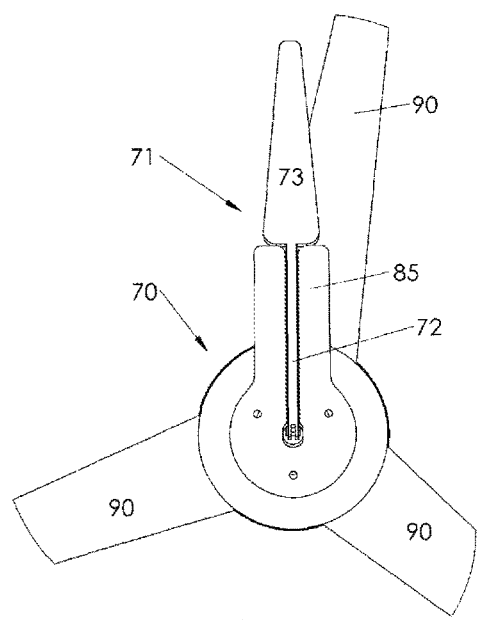
FIGS. 4c and 4d show the gear-shift arrangement according to FIGS. 4a and 4b in a second position.
Figure 4D:
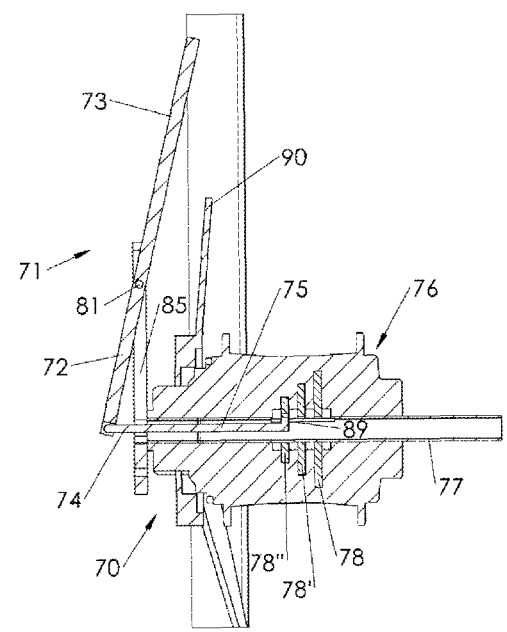

FIGS. 4a and 4b as well as FIGS. 4c and 4d show a third embodiment of a gear-shift arrangement 70, which comprises a gear selector 71, which has a lower or inner base portion 72 and an upper or outer portion in the shape of a handle 73, a connector member 74, and a shift member 75.

The shift member 75 is provided with a cogged portion 89 and is inside an internal-gear hub 76 having a wheel axle 77 axially moveable to engage gears 78, 78' and 78", respectively. In this embodiment, the connector member 74 is in the form of an extension to shift member 75, and connector member 74 can, in fact, be regarded as an outer portion of shift member 75. The gear-shift arrangement 70 comprises further a holding member 85. As is best seen in FIGS. 4b and 4d, the gear selector 71 is somewhere along its length attached to the holding member 85 by a pivot shaft 81, such that gear selector 71 can rotate around pivot shaft 81. Since the inner or lower end of gear selector 71 is attached to the connector member 74, and thereby directly to shift member 75, the gear selector 71 is actually a lever arm 71 having pivot shaft 81 as its pivot point. In FIGS. 4a to 4d also spokes 90 are visible. Spokes 90 are attached to a gripping ring not seen in FIGS. 4a to 4d.

By comparing FIGS. 4a-b with FIGS. 4c-d, it can be seen that a user by gripping the handle or handle portion 73 and pushing handle portion 73 inwards towards a wheelchair wheel, such that the gear selector 71 or lever arm 71 rotates around pivot shaft 81 in a clockwise direction and base portion 72 moves outwards, the connector member 74 and thereby shift member 75 is pulled outwards which causes the cogged portion 89 of shift member 75 to move from engagement with gear 78 into engagement with gear 78". The pivot shaft 81 can be placed such that the length of the base portion 72 of lever arm 71 is shorter than the length of the handle portion 73, which has the advantageous effect that the force needed to shift gear is small in accordance with the well-known lever principle.

In order to shift gear back to either gear 78' or all the way back to gear 78, the user grips the handle or handle portion 73 and pulls gear selector or lever arm 71 outwards, such that lever arm 71 rotates around pivot shaft 81 in a counter-clockwise direction and base portion 72 moves inwards, thereby pushing the cogged portion 89 of shift member 75 into engagement with gear 78' or all the way back into engagement with gear 78. The total length of a lever arm can range from about 100 mm to about 300 mm and more preferably from about 150 mm to about 200 mm, while the length of a base portion preferably constitutes from about 10% to about 50% of the total lever arm length. As should be appreciated, in a lever arm embodiment of the invention there is no particular reason for a gear selector and a holding member to occupy a large circle sector, and gear selector and a holding member can occupy a circle sector ranging from about 10 degrees to about 20 degrees.

A common feature of all gear-shift arrangements presented herein is that a gear selector and any existing guiding or holding members do not rotate as a user propels a wheelchair. It is therefore easy for a user to locate the gear selector when he or she wants to shift gear in order to change the rotational speed of a gripping ring in relation to the rotational speed of adjoining wheelchair wheel.

Although the present invention has been described with reference to specific embodiments, also shown in the appended drawings, it will be apparent to those skilled in the art that many variations and modifications can be done within the scope of the invention as described in the specification and defined with reference to the claims below.

The invention claimed is:

1. A wheel assembly comprising a wheel for a wheelchair, a gripping ring connected to the wheel, and a gear-shift arrangement;
the wheel being provided with a wheel axle;
the gear-shift arrangement being configured to change a gear ratio between the wheel and the gripping ring;
the gear-shift arrangement comprising:
an internal-gear hub comprising a number of internal gears,
a shift member, and
a gear selector;
wherein the gear selector and the gripping ring are located on the same side of the wheel;
wherein the gear selector is operatively connected to the shift member, which is axially moveable within the internal-gear hub to engage a specific gear of said number of internal gears, and the gear selector has an inner base portion and an outer handle portion and extends radially away from the wheel axle;
wherein the base portion of the gear-shift arrangement comprises a cam curve having a number of fixed positions therein; and
wherein the shift member, via a connector member, is connected to a sliding element configured to slide in the cam curve and be positioned in a fixed position by a user gripping and moving the handle portion in a circumferential direction.

2. The wheel assembly according to claim 1, wherein the gear selector occupies a circle sector.

3. The wheel assembly according to claim 1, wherein neighboring fixed positions of the cam curve are spaced apart by both a circumferential distance and a radial distance, the circumferential distance being larger than the radial distance.

4. The wheel assembly according to claim 3, wherein the connector member of the gear-shift arrangement is in the form of a chain.

5. The wheel assembly according to claim 3, wherein the connector member of the gear-shift arrangement is in the form of a wire.

6. The wheel assembly according to claim 1, wherein the connector member of the gear-shift arrangement is in the form of a chain.

7. The wheel assembly according to claim 1, wherein the connector member of the gear-shift arrangement is in the form of a wire.

8. The wheel assembly according to claim 1, wherein the gear selector of the gear-shift arrangement is rotatably attached to a pivot shaft provided in a holding member extending in close relation to the gear selector, such that the gear selector constitutes a lever arm whose lower end is connected to the shift member.

9. The wheel assembly according to claim 8, wherein the pivot shaft divides the gear selector into the inner base portion and the outer handle portion, and the inner base portion is shorter than the outer handle portion.

10. A wheel assembly comprising a wheel for a wheelchair, a gripping ring connected to the wheel, and a gear-shift arrangement;
the wheel being provided with a wheel axle;
the gear-shift arrangement being configured to change a gear ratio between the wheel and the gripping ring;
the gear-shift arrangement comprising:
an internal-gear hub comprising a number of internal gears,
a shift member, and
a gear selector;
wherein the gear selector and the gripping ring are located on the same side of the wheel;
wherein the gear selector is operatively connected to the shift member, which is axially moveable within the internal-gear hub to engage a specific gear of said number of internal gears, and the gear selector has an inner base portion and an outer handle portion and extends radially away from the wheel axle;

wherein the gear selector of the gear-shift arrangement is rotatably attached to a pivot shaft provided in a holding member extending in close relation to the gear selector, such that the gear selector constitutes a lever arm whose lower end is connected to the shift member; and wherein the pivot shaft divides the gear selector into the inner base portion and the outer handle portion, and the inner base portion is shorter than the outer handle portion.

11. The wheel assembly according to claim 10, wherein the gear selector occupies a circle sector.

12. The wheel assembly according to claim 10, wherein the base portion of the gear-shift arrangement comprises a cam curve having a number of fixed positions therein;

wherein the shift member, via a connector member, is connected to a sliding element configured to slide in the cam curve and be positioned in a fixed position by a user gripping and moving the handle portion in a circumferential direction; and wherein neighboring fixed positions of the cam curve are spaced apart by both a circumferential distance and a radial distance, the circumferential distance being larger than the radial distance.

13. The wheel assembly according to claim 12, wherein the connector member of the gear-shift arrangement is in the form of a chain.

14. The wheel assembly according to claim 12, wherein the connector member of the gear-shift arrangement is in the form of a wire.

15. The wheel assembly according to claim 10, wherein the base portion of the gear-shift arrangement comprises a cam curve having a number of fixed positions therein;

wherein the shift member, via a connector member, is connected to a sliding element configured to slide in the cam curve and be positioned in a fixed position by a user gripping and moving the handle portion in a circumferential direction; and wherein the connector member of the gear-shift arrangement is in the form of a chain.

16. The wheel assembly according to claim 10, wherein the base portion of the gear-shift arrangement comprises a cam curve having a number of fixed positions therein;

wherein the shift member, via a connector member, is connected to a sliding element configured to slide in the cam curve and be positioned in a fixed position by a user gripping and moving the handle portion in a circumferential direction; and wherein the connector member of the gear-shift arrangement is in the form of a wire.

* * * * *